(12) United States Patent
Wada et al.

(10) Patent No.: US 7,811,356 B2
(45) Date of Patent: Oct. 12, 2010

(54) METHOD OF PURIFYING METAL

(75) Inventors: Kenji Wada, Takarazuka (JP); Toshiaki Fukuyama, Nara (JP); Ryotatsu Otsuka, Kawachinagano (JP)

(73) Assignee: Sharp Kabushiki Kaisha, Osaka (JP)

( * ) Notice: Subject to any disclaimer, the term of this patent is extended or adjusted under 35 U.S.C. 154(b) by 625 days.

(21) Appl. No.: 11/631,287

(22) PCT Filed: Jul. 4, 2005

(86) PCT No.: PCT/JP2005/012319

§ 371 (c)(1),
(2), (4) Date: Jan. 3, 2007

(87) PCT Pub. No.: WO2006/006436

PCT Pub. Date: Jan. 19, 2006

(65) Prior Publication Data

US 2008/0289150 A1 Nov. 27, 2008

(30) Foreign Application Priority Data

Jul. 14, 2004 (JP) .............................. 2004-207591

(51) Int. Cl.
*C22B 61/00* (2006.01)
*C22B 9/02* (2006.01)
*C01B 31/00* (2006.01)
(52) U.S. Cl. .......................... 75/588; 75/708; 423/348
(58) Field of Classification Search ............... 75/414, 75/588, 708; 423/348

See application file for complete search history.

(56) References Cited

U.S. PATENT DOCUMENTS

| 3,543,531 | A |   | 12/1970 | Adams |
|-----------|---|---|---------|-------|
| 4,539,194 | A |   | 9/1985  | Halvorsen |
| 4,747,906 | A |   | 5/1988  | Shingu et al. |
| 4,854,968 | A | * | 8/1989  | Otsuka et al. ............... 164/118 |
| 6,398,845 | B1 |  | 6/2002  | Tabuchi et al. |
| 6,861,040 | B1 | * | 3/2005 | Ceccaroli et al. ............ 423/348 |

FOREIGN PATENT DOCUMENTS

CN          1409691         4/2003

(Continued)

OTHER PUBLICATIONS

International Search Report for PCT/JP2005/012319 mailed Aug. 30, 2005.

(Continued)

*Primary Examiner*—George Wyszomierski
*Assistant Examiner*—Tina M McGuthry-Banks
(74) *Attorney, Agent, or Firm*—Nixon & Vanderhye P.C.

(57) ABSTRACT

The disclosure is directed to a method for purifying metals, which can very efficiently and inexpensively eliminate impurity elements included in various metallic or semiconductor materials, or more specifically included in metallurgical grade silicon.

9 Claims, 2 Drawing Sheets

FOREIGN PATENT DOCUMENTS

| | | |
|---|---|---|
| JP | 63-045112 | 2/1988 |
| JP | 04-017629 | 1/1992 |
| JP | 06-227808 | 8/1994 |
| JP | 07-206420 | 8/1995 |
| JP | 7-206420 A | 8/1995 |
| JP | 07-315827 | 12/1995 |
| JP | 2000-351616 A | 12/2000 |
| JP | 2001-172729 | 6/2001 |
| JP | 2003-516295 | 5/2003 |
| WO | 97/03922 | 2/1997 |
| WO | 01/42136 | 6/2001 |

OTHER PUBLICATIONS

Sinbo et al., (881)*Interaction of Ca and P in Molten Si*, Collected Abstracts of the 2002 Autumn Meeting of the Japan Institute of Metals.

Supplementary European Search Report mailed Feb. 16, 2009 in corresponding EP application 05765236.4.

\* cited by examiner

METHOD OF PURIFYING METAL

This application is the US national phase of international application PCT/JP2005/012319 filed 4 Jul. 2005, which designated the U.S. and claims priority to JP 2004-207591 filed 14 Jul. 2004, the entire content of each of which is hereby incorporated by reference.

TECHNICAL FIELD

The present invention relates generally to a method of purifying a material such as a metal or a semiconductor, and more particularly to a method of producing a silicon material for use in solar cells.

BACKGROUND ART

Metallic and semiconductor elements such as iron, aluminum, copper, silicon, etc. are very unlikely to exist as simple substances in the natural world, and those elements mostly exist as oxides or other compounds. Thus, in order to use the metallic or semiconductor elements as structural materials, conductive materials, semiconductor materials or the like, it is often necessary to reduce their oxides or the like to simple substances of the metallic or semiconductor elements.

Further, desired metallic or semiconductor materials as just reduced from their oxides or the like often contain impurities at concentrations that are improper for such uses of the materials as mentioned above. As such, adjustment of the impurity concentrations, which is reduction in many cases, is generally carried out. Such a process of reducing the impurity concentrations is called purification.

In other words, the purification means extraction of impurities in their different state from a simple substance of a metal or a semiconductor, which is carried out by appropriate physico-chemical processing that is suitable for physico-chemical properties of the metallic or semiconductor matrix and/or the impurity elements.

In the case of copper that is a typical material for electric wire, for example, so-called unidirectional solidification is used to increase purity of the copper to obtain a wire material having a low electric resistance value. In the unidirectional solidification process which utilizes the fact that the ratio of an impurity concentration in a solid state to that in a molten sate of a metallic or semiconductor material, i.e., a so-called segregation coefficient of the impurity, is generally small in the equilibrium state, the solidification is conducted at a slow rate near the equilibrium state so as to reduce the impurity concentration in the solidified copper.

In the case of silicon that is most widely used as a semiconductor material, metallurgical grade silicon having a purity of 98% or more, which is obtained by reducing silica, is converted into gas such as silane ($SiH_4$) or trichlorosilane ($SiHCl_3$) which is then reduced with hydrogen in a bell jar furnace to obtain polycrystalline silicon having a purity of 11N. From the polycrystalline silicon, single-crystalline silicon is grown to obtain silicon wafers to be used for electronic devices such as LSIs. In order to satisfy the requirements for use in electronic device applications, very complicated production processes and strict management thereof are required, which inevitably increases the production costs.

Meanwhile, in recent years, there is a rapidly increasing demand for silicon as a material of solar cells, because of increased concern about energy and environmental problems such as depletion of fossil fuels, global warming and others. In the case of silicon for use in solar cells, the purity necessary for desired performance of the solar cell is in the order of 6N. This means that silicon as being out of the standard for use in electronic devices, which has conventionally been used as the material for solar cells, has excessive quality as the material of solar cells from the standpoint of purity.

To date, the produced amount of silicon as being out of the standard for use in electronic devices has been greater than the demanded amount of silicon for use in solar cells. It is expected that, in the near future, the demanded amount of silicon for use in solar cells will exceed the produced amount of silicon as being out of the standard for use in electronic devices, and thus there is a strong demand for establishment of a technique enabling inexpensive production of silicon as the material for solar cells. Recently, attention is drawn to a method of purifying metallurgical grade silicon having a purity of about 98% as mentioned above by a metallurgical method using solidification segregation or the like.

Iron, aluminum, titanium and the like are contained in relatively large amounts among the impurity elements of heavy metals or semiconductors in metallurgical grade silicon. The impurity concentrations in metallurgical grade silicon are typically as follows: 100-5000 ppmw for iron, 100-2000 ppmw for aluminum, and 1-10 ppmw for titanium.

It is known that the above-described segregation coefficients of the heavy metal elements in silicon are small. For example, according to the 1997 year report of the SOGA (Solar-Grade Silicon Technology Research Association), the segregation coefficients of iron, aluminum and titanium are $6.4 \times 10^{-6}$, $2.8 \times 10^{-3}$, and $7.37 \times 10^{-6}$, respectively. The concentration of each of these impurity elements can be reduced to a level of 0.1 ppmw or less required in the material for solar cells, by conducting purification utilizing solidification segregation two or three times, as represented by the unidirectional solidification described above.

The solidification segregation method is advantageous in that a number of impurity elements can be processed at the same time. In the unidirectional solidification, however, a molten metal or semiconductor introduced into a mold is solidified at a slow rate near the equilibrium state as described above, and thus the processing rate is very slow.

Further, in the resultant ingot, a portion obtained in the earlier stage of solidification has impurity concentrations smaller than those before the solidification processing (which portion is hereinafter referred to as the "purified portion"), while a portion obtained in the later stage of solidification has impurity concentrations higher than those before the solidification processing (which portion is hereinafter referred to as the "impurity-concentrated portion"). The ratio of such impurity-concentrated portion with respect to the entire solidified ingot is about 20% to 50%, though it varies depending on the impurity concentrations before the solidification processing, the speed of solidification, the degree of stirring of the molten metal or semiconductor, and the like. That is, in order to carry out the solidification processing two or three times, it is necessary to eliminate the impurity-concentrated portions of considerable amounts by cutting them off.

Further, an additional crushing step is necessary in order to introduce the purified portion again into the furnace for melting. Such cutting and crushing steps can be performed on the solidified ingot only after it is cooled near a room temperature, which takes several to several tens of hours. As such, conducting the unidirectional solidification a plural number of times poses considerable problems with regard to the yield rate and throughput.

The values of the segregation coefficients mentioned above ($6.4 \times 10^{-6}$ for iron, $2.8 \times 10^{-3}$ for aluminum and $7.37 \times 10^{-6}$ for titanium) are obtained with a very slow solidification rate near an approximately equilibrium state, which are called equilibrium segregation coefficients. The segregation coefficient in the actual solidification segregation processing becomes larger than the equilibrium segregation coefficient. As the solidification speed increases, the segregation coefficient becomes larger than the equilibrium segregation coefficient. The segregation coefficient in this case is called an effective segregation coefficient. The effective segregation coefficient "ke" and the equilibrium segregation coefficient "ko" have the relation indicated by the following expression (1):

$$ke=ko/\{ko+(1-ko)e^{-[R\delta/D]}\} \qquad (1).$$

From the above expression (1), it is understood that the effective segregation coefficient is determined by the solidification speed R, the thickness δ of the impurity-concentrated layer, and the impurity diffusion coefficient D. The impurity-concentrated layer refers to a portion near the solidification interface where the impurities are concentrated as they are discharged into the molten metal or semiconductor during solidification. The thickness δ of the impurity-concentrated layer is not the actual thickness of the impurity-concentrated layer, but it refers to an imaginary thickness to be used in the expression. From the industrial point of view, it is desired to increase the solidification speed and reduce the effective segregation coefficient, for which it is effective to reduce the thickness of the impurity-concentrated layer.

As a purifying method utilizing solidification segregation, a method of immersing a rotary cooling body into molten silicon and causing high-purity silicon to be crystallized on the outer peripheral surface of the rotary cooling body is disclosed in Japanese Patent Laying-Open No. 63-45112. The method is characterized in that the impurity-concentrated layer is dispersed by stirring the molten metal or semiconductor with rotation of the cooling body, which can increase the solidification speed while maintaining a small segregation coefficient.

Japanese Patent Laying-Open No. 63-45112, however, merely discloses the method of conducting the purifying processing only one time. As described above, it is necessary to carry out purification utilizing solidification segregation two or three times in order to reduce the heavy metal impurity concentrations in metallurgical grade silicon to the level of 0.1 ppmw or less required in the material for solar cells. As such, in order to produce a material for use in solar cells using the relevant method, a way of continuously performing the purifying processing needs to be newly invented.

Meanwhile, considering use for solar cells, elements for determining the conductivity type of silicon among the impurities contained therein need to be most severely controlled in their concentrations, which are typically phosphorus and boron. These elements however have considerably large segregation coefficients on the order of 0.35 and 0.8, respectively, so that it is considered that the purifying method utilizing solidification segregation is hardly effective therefor.

For example, the concentration of phosphorus in metallurgical grade silicon is typically from 30 to 50 ppmw. In order to reduce this concentration to the level of 0.1 ppmw or less required in the material for solar cells, solidification segregation processing will have to be carried out a large number of times. As such, it has been considered that it is very difficult to use the solidification segregation processing for the purpose of eliminating phosphorus, from the industrial point of view.

Thus, as a method of removing phosphorus utilizing a principle other than solidification segregation, a method of melting metallurgical grade silicon under a reduced pressure of 10 Pa or less is disclosed in Japanese Patent Laying-Open No. 6-227808, and a method of irradiating a surface of molten metallurgical grade silicon with an electron beam under a reduced pressure is disclosed in Japanese Patent Laying-Open No. 7-315827. In these methods, the vapor pressure of phosphorus is relatively large, and the evaporation rate of phosphorus is increased by evacuation. In order to process a large amount of molten silicon of high temperature in a vacuum, however, the vacuum pumping facility needs to be increased in size, and the members that can be used within the furnace are restricted, hindering practical use of those methods.

In the 2002 Autumn Meeting of the Japan Institute of Metals (Nov. 3, 2002), it was reported that when the calcium concentration in silicon was set to 0 atomic %, 5 atomic % (7 mass %) and 10 atomic % (14 mass %), the equilibrium distribution coefficient of phosphorus became 0.35, 0.17 and 0.08, respectively.

According to trial calculation based on this report, in the case that the solidification segregation processing is conducted three times with respect to the metallurgical grade silicon having a phosphorus concentration of 30 ppmw, the phosphorus concentration will become 1.3 ppmw, 0.15 ppmw and 0.015 ppmw with the calcium concentrations of 0 mass %, 7 mass % and 14 mass %, respectively. That is, there has been found a possibility that the phosphorus concentration of the level of 0.1 ppmw or less required in the material for solar cells can be achieved by conducting solidification segregation processing two or three times as in the case of removing the heavy metal impurity elements of iron, aluminum and the like, under the condition that calcium is added to silicon at a concentration of 14 mass % or more.

As a method of purifying silicon with calcium added to molten silicon, a method of carrying out acid leaching processing twice after solidification of metallurgical grade silicon added with calcium of 1-10 mass % or 0.3-0.95 mass % is disclosed in U.S. Pat. No. 4,539,194 or in Japanese National Patent Publication No. 2003-516295.

U.S. Pat. No. 4,539,194 is silent about the effect of removing phosphorus. According to Japanese National Patent Publication No. 2003-516295, on the other hand, the change of phosphorus concentration is at most form 52 ppmw to 16 ppmw (effective distribution coefficient: 0.31), which means that the effect of removing phosphorus by this method is small. This is presumably for the following reasons. When a solidified ingot is crushed in order to efficiently carry out acid leaching, the area of grain boundaries appearing on surfaces of the crushed ingot is insufficient, and thus phosphorous that has segregated at the grain boundaries cannot be removed sufficiently. This shows difficulty in removing phosphorus by the acid leaching method.

Patent Document 1: Japanese Patent Laying-Open No. 63-45112

Patent Document 2: Japanese Patent Laying-Open No. 6-227808

Patent Document 3: Japanese Patent Laying-Open No. 7-315827

Patent Document 4: U.S. Pat. No. 4,539,194

Patent Document 5: Japanese National Patent Publication No. 2003-516295

DISCLOSURE OF THE INVENTION

Problems to be Solved by the Invention

An object of the present invention is to provide a method for purifying metals, which can very efficiently and inexpensively eliminate impurity elements included in various metallic or semiconductor materials, or more specifically included in metallurgical grade silicon.

Means for Solving the Problems

According to an aspect of the present invention, there is provided a method for purifying a metal, including: a first step of holding a first molten metal containing impurities in a first crucible; a second step of immersing a first cooling body in the first molten metal held in the first crucible while letting a cooling fluid flow in the interior of the cooling body to crystallize a first purified metal on a surface of the cooling body; a third step of taking out the first cooling body with the first purified metal crystallized thereon from the first molten metal; a fourth step of holding in a crucible a second molten metal having an impurity concentration less than that of the first molten metal of the first step; a fifth step of melting the first purified metal crystallized in the second step and holding the molten metal in a second crucible together with the second molten metal held in the fourth step; a sixth step of immersing a second cooling body in the second molten metal held in the fifth step while letting a cooling fluid flow in the interior of the cooling body to crystallize a second purified metal on a surface of the cooling body; and a seventh step of taking out the second cooling body with the second purified metal crystallized thereon in the sixth step from the second molten metal; wherein the sixth and seventh steps are carried out a plurality of number of times, with repetition of the first through fifth steps a plurality of times, by adding and melting in the first crucible an impurity-containing metal of an amount equal to the amount of the first purified metal crystallized in the first through fifth steps.

Preferably, the crucible in the fourth step is the same as the second crucible in the fifth step.

Preferably, the method for purifying a metal further includes: an m-th step of holding in a crucible an n-th molten metal having an impurity concentration less than that of a molten metal of an (m−4)-th step after an (m−1)-th step, where m=4(n−1) and n is a natural number of 3 or larger; an (m+1)-th step of melting an (n−1)-th purified metal crystallized in an (m−2)-th step and holding the molten metal in an n-th crucible together with the n-th molten metal held in the m-th step; an (m+2)-th step of immersing an n-th cooling body in the molten metal held in the (m+1)-th step while letting a cooling fluid flow in the interior of the cooling body to crystallize an n-th purified metal on a surface of the cooling body; and an (m+3)-th step of taking out the n-th cooling body with the n-th purified metal crystallized thereon in the (m+2)-th step from the n-th molten metal; wherein the m-th through (m+3)-th steps are further carried out a plurality of times.

Preferably, after the fifth step, the first cooling body with the first purified metal crystallized thereon having been melted out is used again as the first cooling body in the second step.

Preferably, after the seventh step, the second cooling body with the second purified metal crystallized thereon having been melted out is used again as the second cooling body in the sixth step.

Preferably, after the (m+3)-th step, the n-th cooling body with the n-th purified metal crystallized thereon having been melted out is used again as the n-th cooling body in the (m+2)-th step.

Preferably, the sixth and seventh steps are carried out a plurality of times with repetition of the first through fifth steps a plurality of times.

Preferably, the second molten metal is used a predetermined number of times as the first molten metal.

Preferably, the n-th molten metal is used a predetermined number of times as the (n−1)-th molten metal.

Preferably, the molten metal is silicon, the impurity is phosphorus, n is 5 or 6, and calcium is added in the first through third molten metals.

EFFECTS OF THE INVENTION

According to the present invention, it is possible to provide a method of purifying a metallic or semiconductor material, which utilizes the solidification segregation, exhibits high efficiency, improves the yield rate and throughput, and reduces the production costs.

DESCRIPTION OF THE REFERENCE SIGNS 11, 12, 13, 14, 15: melting furnace; 21, 22, 23, 24, 25: crucible; 31, 32, 33, 34, 35: electromagnetic induction heating device; 41, 42, 43, 44, 45: heat insulating material; 51, 52, 53, 54, 55: forward path of cooling fluid; 511, 521, 531, 541, 551: outlet of cooling fluid; 61, 62, 63, 64, 65: return path of cooling fluid; 71, 72, 73, 74, 75: shaft; 81, 82, 83, 84, 85: cooling body; 91: raw silicon supplier; 101, 102, 103, 104, 105: molten silicon; and 111, 112, 113, 114, 115: purified silicon.

BEST MODES FOR CARRYING OUT THE INVENTION

A method for purifying a metal according to the present invention includes: a first step of holding a first molten metal containing impurities in a first crucible; a second step of immersing a first cooling body in the first molten metal held in the first crucible while letting a cooling fluid flow in the interior of the cooling body to crystallize a first purified metal on a surface of the cooling body; a third step of taking out the first cooling body with the first purified metal crystallized thereon from the first molten metal; a fourth step of holding in a crucible a second molten metal having an impurity concentration less than that of the first molten metal of the first step; a fifth step of melting the first purified metal crystallized in the second step and holding the molten metal in a second crucible together with the second molten metal held in the fourth step; a sixth step of immersing a second cooling body in the second molten metal held in the fifth step while letting a cooling fluid flow in the interior of the cooling body to crystallize a second purified metal on a surface of the cooling body; and a seventh step of taking out the second cooling body with the second purified metal crystallized thereon in the sixth step from the second molten metal.

Accordingly, it becomes possible to continuously carry out purification utilizing solidification segregation, and then to efficiently reduce the impurity concentration and also reduce the process costs.

Hereinafter, for the purpose of facilitating understanding of the present invention, a method of purifying a metal in the case that a semiconductor material of silicon is used as the metal, while iron, aluminum and phosphorus are contained as impurities, will be described in detail with reference to the drawings. It will readily be understood by a person skilled in the art that the present invention is not restricted to the above case but also applicable to any other cases as long as the solidification segregation phenomenon is utilizable.

Figure 1:
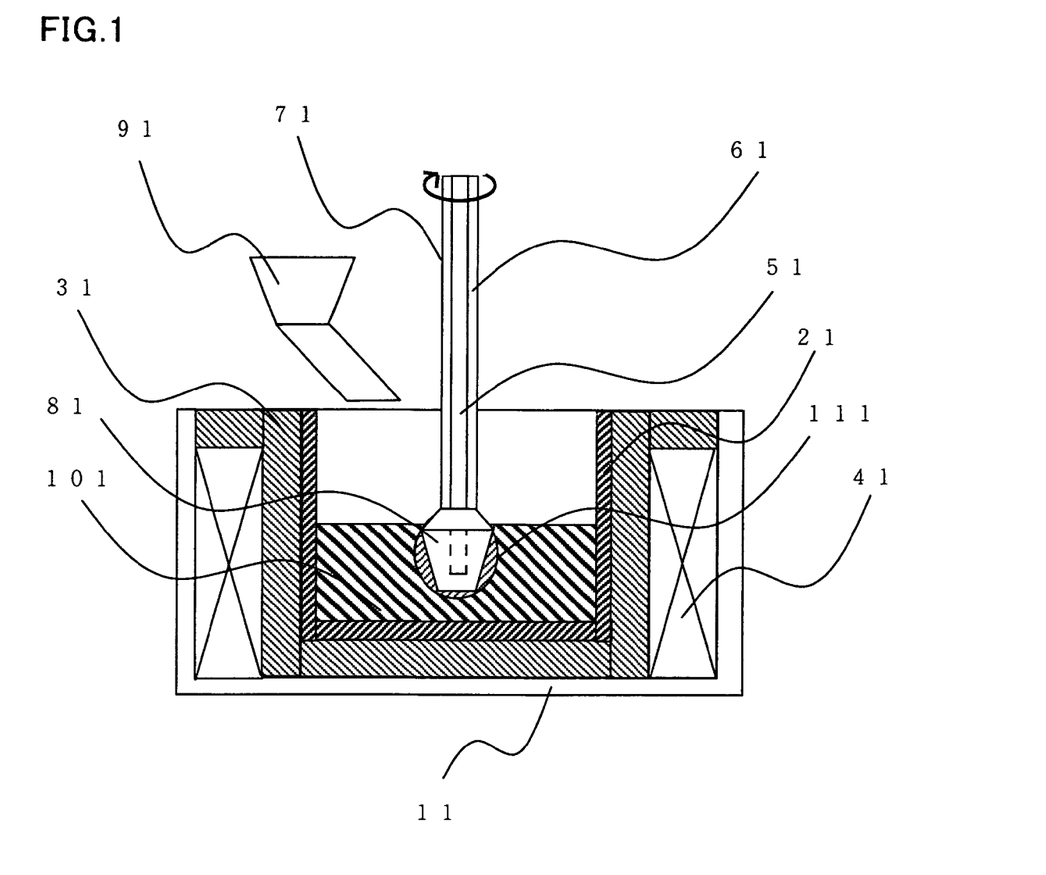
FIG. 1 is a schematic cross sectional view of an apparatus usable in the present invention.

FIG. 1 is a schematic cross sectional view of an apparatus usable in the present invention. In FIG. 1, a melting furnace 11 includes: a crucible 21 of graphite for holding silicon; a heat insulating member 31; an electromagnetic induction heating device 41; a shaft 71 movable up and down with an elevating mechanism and having a forward path of cooling fluid 51 and a return path of cooling fluid 61 formed therein; and a cooling body 81 attached to the bottom end of shaft 71 and in communication with return path of cooling fluid 61. In the figure, an arrow indicates that shaft 71 is rotatable. Molten silicon 101 is held in crucible 21. One or more melting furnaces $1z$ ($z=2, 3, \ldots$) having a constitution similar to that of melting furnace 11 may be provided as desired. In such a case, a crucible $2z$ is set in the corresponding melting furnace $1z$. FIG. 1 shows a state in which purified silicon 111 is crystallized on a surface of cooling body 81.

<First Step>

In the present invention, the first step is a step of holding a first molten metal (silicon) containing impurities in a first crucible. Specifically, in melting furnace 11, a desired amount of metallurgical grade silicon lumps are introduced into crucible 21 by a metallurgical grade silicon supplier 91 provided above crucible 21. Crucible 21 is heated by an electromagnetic induction heating device 41 to increase the temperature of the metallurgical grade silicon introduced in crucible 21 to the melting point 1412° C. of silicon or higher, particularly to a temperature in the range from 1412° C. to 1600° C., to thereby maintain the metallurgical grade silicon in its molten state.

<Second Step>

In the present invention, the second step is a step of immersing a first cooling body in the first molten metal (silicon) held in the first crucible while letting a cooling fluid flow in the interior of the cooling body, to crystallize a first purified metal (silicon) on a surface of the cooling body. This step will be explained specifically with reference to FIG. 2.

Figure 2:
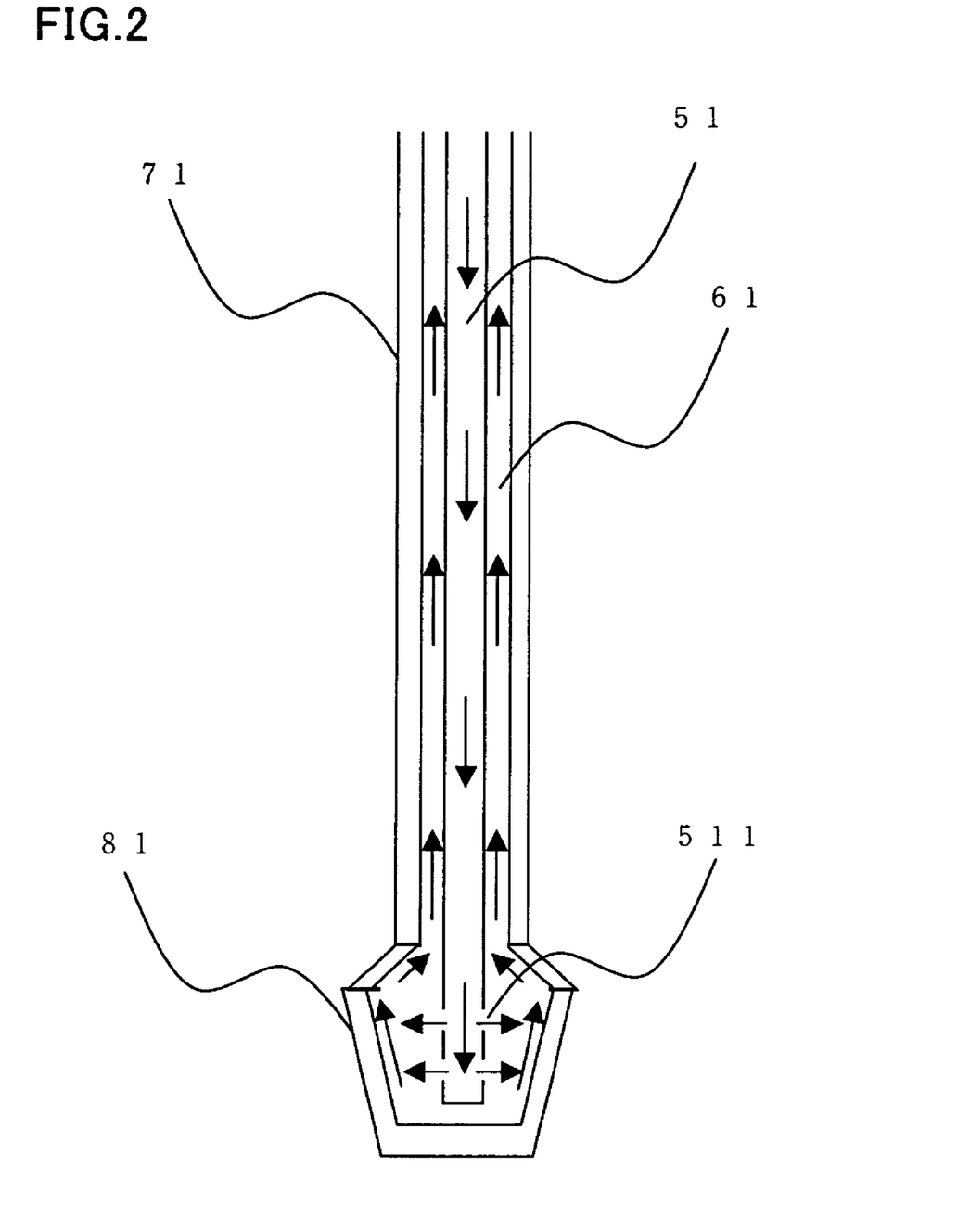
FIG. 2 is an enlarged cross sectional view of a shaft and a cooling body in the apparatus of FIG. 1 usable in the present invention.

FIG. 2 is an enlarged cross sectional view of shaft 71 and cooling body 81 in the apparatus of FIG. 1 usable in the present invention. In this figure, arrows represent flowing directions of the cooling fluid.

A rotary driving mechanism is attached to the top of shaft 71, which can rotate shaft 71 while immersing cooling body 81 in the molten silicon. Cooling body 81 is immersed in the molten silicon when shaft 71 is lowered while being rotated.

A forward path of cooling fluid 51 has outlets of cooling fluid 511 formed as openings at its bottom end. The cooling fluid introduced through forward path of cooling fluid 51 is ejected from outlets of cooling fluid 511, and comes into contact with the inner peripheral surface of cooling body 81. At this time, the cooling fluid absorbs heat from the inner peripheral surface of cooling body 81. Thereafter, the fluid is discharged to the outside through return path of cooling fluid 61.

While the cooling fluid is introduced continuously, heat is continuously absorbed from the inner peripheral surface of cooling body 81, which causes heat current in the direction from the outer peripheral surface to the inner peripheral surface of cooling body 81. The surface temperature of cooling body 81 is lowered to the melting point 1412° C. of silicon or lower, and thus the molten silicon existent in the vicinity of the surface of cooling body 81 comes to solidify, resulting in crystallization of purified silicon (first purified metal). Typically, the cooling fluid may be an inert gas such as nitrogen, argon or the like, though it is not restricted thereto.

Under condition that the solidification speed is controlled in an appropriate range, impurities contained in the original metallurgical grade silicon are discharged to the molten silicon side upon crystallization of the molten silicon. As a result, the crystallized solid ingot (hereinafter, referred to as "purified silicon") on the surface of cooling body 81 has an impurity concentration reduced from that of the original metallurgical grade silicon. When the solidification of the molten silicon is continued while the cooling fluid is being introduced for a predetermined period of time, a desired amount of purified silicon (hereinafter, referred to as the "first purified silicon") can be obtained as the first purified metal through crystallization. This step is the second step.

In the second step, shaft 71 is rotated to cause swift flow in the molten silicon so as to disperse an impurity-concentrated layer formed near the interface between the molten silicon and the purified silicon crystallized on the surface of cooling body 81. At this time, when a baffle plate is immersed in the molten silicon, the flow caused in the molten silicon is disturbed, which improves the effect of dispersing the impurity-concentrated layer, and accordingly, the effective segregation coefficient of the impurities can be reduced.

Although cooling body 81 has a tapered shape with its radius smaller in the bottom portion than in the top portion, the shape is not restricted thereto as long as it enables crystallization of purified silicon with a desired purity.

<Third Step>

In the present invention, the third step is a step of taking out the first cooling body with the first purified metal (silicon) crystallized thereon from the first molten metal. Specifically, after a desired amount of the first purified silicon is crystallized in the second step, shaft 71 is raised to take out cooling body 81 that has been immersed in the molten silicon.

<Fourth Step>

In the present invention, the fourth step is a step of holding in a crucible a second molten metal (silicon) having an impurity concentration less than that of the first molten metal (silicon) of the first step. Specifically, as described above, it is necessary to carry out solidification segregation processing two or three times in order to reduce the heavy metal impurity concentrations of iron, aluminum and the like to the level of 0.1 ppmw or less required in silicon for use in solar cells. This means that it is necessary to melt the first purified silicon taken out in the third step and carry out the solidification segregation processing again. Thus, molten silicon (second molten metal) having the heavy metal impurity concentration smaller than that of the metallurgical grade silicon used in the first step is held in a crucible 22 set in a melting furnace 12.

Although melting furnace 12 has a constitution similar to that of melting furnace 11 in which solidification segregation processing can be carry out, it does not necessarily need to have the constitution enabling the solidification segregation processing if the furnace is to be used only in the fourth step. All that is needed is that it includes a crucible for holding the molten silicon and a heating device.

<Fifth Step>

In the present invention, the fifth step is a step of melting the first purified metal (silicon) crystallized in the second step and holding the molten metal in a second crucible together with the second molten metal (silicon) held in the fourth step.

Specifically, shaft 71 taken out in the third step is moved to above crucible 22, and then lowered to immerse cooling body 81 with the first purified silicon crystallized thereon into the molten silicon (second molten metal) having the impurity concentration smaller than that of the metallurgical grade silicon used in the first step and held in crucible 22 set in melting furnace 12, to thereby melt the first purified silicon.

The crucible for holding the molten silicon in the fifth step does not necessarily have to be crucible 22 set in melting furnace 12. For example, a melting furnace provided only with a crucible and a heating device may be prepared, and molten silicon having an impurity concentration smaller than that of the metallurgical grade silicon used in the first step may be held in the prepared melting furnace, and this molten silicon may be introduced into crucible 22 set in melting furnace 12 as desired.

Although the first purified silicon is melted in the state that it is immersed in the molten silicon in the above description, the melting method is not particularly restricted. For example, a heating device may additionally be provided for use in heating the first purified silicon for melting.

<Sixth Step>

In the present invention, the sixth step is a step of immersing a second cooling body in the second molten metal held in the fifth step while letting a cooling fluid flow in the interior of the cooling body to crystallize a second purified metal on a surface of the cooling body.

Specifically, after the first purified silicon is melted completely, shaft 71 is raised and moved again to above crucible 21 set in melting furnace 11. Thereafter, a shaft 72 provided for melting furnace 12 is lowered to immerse a cooling body 82 in the molten silicon held in crucible 22 while introducing a cooling fluid from a forward path of cooling fluid 52 to thereby crystallize second purified silicon (second purified metal) on the surface of cooling body 82.

<Seventh Step>

In the present invention, the seventh step is a step of taking out the second cooling body with the second purified metal crystallized thereon in the sixth step from the second molten metal. Specifically, after a desired amount of the second purified silicon is crystallized in the sixth step, shaft 72 is raised to take out cooling body 82 that has been immersed in the molten silicon.

The second purified silicon obtained through the first to seventh steps described above has twice undergone solidification segregation processing, and the impurity concentrations of iron, aluminum and other heavy metals can each be reduced to the level of 0.1 ppmw or less required in the material for solar cells.

In the present invention, the first purified silicon is produced continuously in melting furnace 11, by carrying out the first through fifth steps a plurality of times. In this case, after the fifth step, shaft 71 that was used for melting the first purified silicon is immersed again into crucible 21 that was used in the first step, to crystallize the metallurgical grade silicon on the surface of cooling body 81. In the first through fifth steps, when the first purified silicon is again produced as the second time one, i.e., when shaft 17 is immersed again in crucible 21, metallurgical grade silicon of an amount equal to that of the first purified silicon crystallized as the first time one is added and melted in crucible 21 in order to maintain constant the amount of molten silicon being held.

Further, in the present invention, the sixth and seventh steps described above are carried out a plurality of times, to continuously produce the second purified silicon in melting furnace 12. In this case, after the seventh step, shaft 72 from which the second purified silicon has been removed by melting is immersed again in crucible 22 that has been used in the sixth step, to crystallize the purified silicon on the surface of cooling body 82.

In this manner, it is possible to continuously produce the purified silicon satisfying the heavy metal impurity concentration of the level of 0.1 ppmw or less required in the material for solar cells.

It is noted that it may be necessary to carry out the solidification segregation processing three or more times, depending on the concentration(s) of the heavy metal impurity element(s) in the metallurgical grade silicon. In such a case, it is preferable to further carry out: an m-th step of holding an n-th molten metal having an impurity concentration less than that of a molten metal in an (m−4)-th step in a crucible after an (m−1)-th step, where m=4(n−1) and n is a natural number of 3 or larger; an (m+1)-th step of melting an (n−1)-th purified metal crystallized in an (m−2)-th step and holding the molten metal in an n-th crucible together with the n-th molten metal held in the m-th step; an (m+2)-th step of immersing an n-th cooling body in the molten metal held in the (m+1)-th step while letting a cooling fluid flow in the interior of the cooling body to crystallize an n-th purified metal on a surface of the cooling body; and an (m+3)-th step of taking out the n-th cooling body with the n-th purified metal crystallized thereon in the (m+2)-th step from the n-th molten metal.

For example, in the case of m=8 and n=3, the following steps are further carried out: the eighth step of holding in a third crucible a third molten metal having an impurity concentration smaller than that of the second molten metal; the ninth step of melting the second purified metal and holding the molten metal in the third crucible together with the third molten metal mentioned above; the tenth step of immersing a third cooling body in the third molten metal while letting a cooling fluid flow in the interior of the cooling body to crystallize a third purified metal on a surface of the cooling body; and the eleventh step of taking out the third cooling body with the third purified metal crystallized thereon from the third molten metal. In this manner, the solidification segregation processing is carried out three times.

More specifically, a melting furnace 13 having a constitution similar to those of melting furnaces 11 and 12 is further provided, and after carrying out the first through seventh steps, operations similar to those in the fourth through seventh steps carried out in melting furnace 12 are carried out in melting furnace 13, so that the purified silicon satisfying the heavy metal impurity concentration of the level of 0.1 ppmw or less required in the material for solar cells is produced.

It is noted that the heavy metal impurity concentration in the molten silicon held in crucible 23 set in melting furnace 13 is smaller than that in the molten silicon held in crucible 22 set in melting furnace 12, and that the second purified silicon is melted and held in crucible 23.

Further, the solidification segregation processing may be necessary four, five, six or more times. In such a case, the solidification segregation processing may be carried out a desired number of times, with n=4, 5, . . . , by performing the respective steps sequentially again in a similar manner as described above.

Furthermore, in the present invention, the above-described (m+2)-th and (m+3)-th steps may be performed a plurality of times in melting furnace In, to continuously produce the n-th purified silicon. In this case, after the (m+3)-th step, shaft $7n$ used for melting the n-th purified silicon is immersed again in crucible $2n$ used in the (m+2)-th step, to crystallize the purified silicon on the surface of cooling body $8n$.

In the present invention, while crystallization of the first purified silicon is continued, the impurity concentration in the molten silicon held in crucible 21 increases from the impurity concentration in the metallurgical grade silicon before initiation of the processing. Similarly, while crystallization of the second purified silicon is continued, the impurity concentration in the molten silicon held in crucible 22 increases from the impurity concentration in the molten silicon before initiation of the processing.

After the purified silicon has been pulled up a preset number of times, the crystallization of purified silicon is stopped so that the impurity concentration in the molten silicon held in crucible 22 should not exceed that in the metallurgical grade silicon held in crucible 21 before initiation of the processing. After stopping the crystallization, the molten silicon within crucible 21 is discharged to the outside of crucible 21, and then all the molten silicon held in crucible 22 is introduced into crucible 21. The first through fifth steps are then repeated such a number of times that accumulated molten silicon does not exceed the capacity of crucible 22, to thereby store in crucible 22 the second silicon having the impurity concentration less than that of the first silicon. Thereafter, the first through seventh steps are repeated to continuously produce the second purified silicon again.

In this manner, it is possible to prevent the impurity concentration in the molten silicon held in crucible 22 from exceeding that in the metallurgical grade silicon held in crucible 21 before initiation of the processing. As such, the molten silicon held in crucible 22 is not discarded but can be utilized for production of the purified silicon in the first through third steps, which can considerably improve the yield rate.

In a conventional unidirectional solidification method, not only the purified portion but also the impurity-concentrated portion is solidified. Thus, if the impurity-concentrated portion of the solidified ingot obtained in the second-time solidification segregation processing is intended to be used as the material for the first-time solidification segregation processing, a step of crushing the impurity-concentrated portion so as to introduce the same into the crucible and a step of melting the solid impurity-concentrated portion will have to be added, posing the problems of an increased capital investment, a decreased throughput, and an increased amount of energy input. In contrast, according to the method of the present invention, the impurity-concentrated portion is handled in the liquid state, which eliminates the need for the steps of crushing and re-melting the impurity-concentrated portion, and thus can solve the above-mentioned problems.

In the present invention, in order to achieve the effect of removing an interested impurity, e.g., phosphorus, utilizing solidification segregation by adding such a material for reducing the segregation coefficient as calcium to the molten metal, it is necessary that the phosphorus-segregated parts are not included in the solidified ingot. To this end, it is preferable to use a method of growing a solidification boundary while keeping the boundary surface smooth, as in the above-described unidirectional solidification method or the method disclosed in Japanese Patent Laying-Open No. 63-45112 in which a rotary cooling body is immersed in molten silicon to cause high-purity silicon to be crystallized on the outer peripheral surface of the rotary cooling body.

It is noted that calcium of about 14 mass % added to reduce the segregation coefficient also needs to be reduced to the level of 0.1 ppmw or less required in the material for solar cells. This requires additional solidification segregation processing for the purpose of removing calcium. The inventors investigated the effect of removing calcium by the solidification segregation processing in advance through experiments, and have revealed that the solidification segregation processing conducted two or three times can reduce the calcium concentration from 14 mass % to 0.1 ppmw or less. That is, the inventors have found that the phosphorus concentration of 0.1 ppmw or less and the calcium concentration of 0.1 ppmw or less, required in the material for solar cells, can be achieved by conducting the solidification segregation processing five or six times in total, i.e., three times for removal of phosphorus and two or three times for removal of calcium.

As described above, the impurity concentration of heavy metal such as iron, aluminum or the like can be reduced to 0.1 ppmw or less by conducting the solidification segregation processing two or three times. This means that when the solidification segregation processing is carried out three times with calcium added and two or three times with no calcium added, not only phosphorus and calcium but also the other heavy metal impurity elements can be reduced to the concentration level of 0.1 ppmw or less required in the material for solar cells.

Hereinafter, the present invention will be described in detail with reference to embodiments, though the present invention is not restricted thereto.

EMBODIMENTS

First Embodiment

Metallurgical grade silicon was purified using the device shown in FIG. 1, according to the method of the present invention. Firstly, metallurgical grade silicon (made in China) of 24 kg was introduced into a crucible 21 made of graphite, the interior of a melting furnace 11 was filled with argon gas atmosphere of 1 atmospheric pressure, and an electromagnetic induction heating device 41 was used to heat crucible 21 to melt the metallurgical grade silicon and hold it at 1550° C.

Next, a shaft 71 was lowered while being rotated at 600 revolutions per minute, nitrogen gas serving as a cooling fluid was introduced through a forward path of cooling fluid 51 at a rate of 7600 liters per minute, and a cooling body 81 was immersed in the molten silicon. As a result, first purified silicon was crystallized on the surface of cooling body 81.

After introducing the nitrogen gas for 10 minutes, shaft 71 was raised to take out cooling body 81 from the molten silicon. Introduction of the nitrogen gas was then stopped. The weight of the first purified silicon obtained under the same condition as described above has been measured in advance as being 3 kg. Then, the metallurgical grade silicon of 3 kg was introduced and melted in crucible 21.

The first purified silicon of 21 kg obtained by repeating the above-described method seven times in melting furnace 11 was melted and held in a crucible 22 set in a melting furnace 12 arranged near melting furnace 11. At this time, a suction tube made of quartz with the molten silicon of about 20 g collected from crucible 22 was immediately immersed into water to rapidly solidify the same that is to be used as a sample for impurity concentration analysis. The concentrations of iron, aluminum, calcium and phosphorus were measured by ICP atomic emission spectrometry, which were 7.0 ppmw, 8.9 ppmw, 2.3 ppmw, and 15 ppmw, respectively.

In the method of producing the first purified silicon as described above, when shaft 71 taken out from melting furnace 11 is moved to just above melting furnace 12 and lowered to immerse cooling body 81 in the molten silicon held in crucible 22, the first purified silicon crystallized on the surface of cooling body 81 is melted. Shaft 71 is then raised and moved to just above melting furnace 11 again. Thereafter, the production of the first purified silicon is repeated in melting furnace 11, by the procedures and conditions similar to those described above.

Next, shaft 72 provided in melting furnace 12 is lowered while being rotated at the speed of 600 revolutions per minute. Cooling body 82 is immersed into the molten silicon, while introducing nitrogen gas as the cooling fluid through forward path of cooling fluid 52 at a rate of 7600 liters per minute, whereby second purified silicon is crystallized on the surface of cooling body 82.

After introducing the nitrogen gas for 10 minutes, shaft 72 is raised to take out cooling body 82 from the molten silicon. Introduction of the nitrogen gas is then stopped. The weight of the second purified silicon in this case was measured, which was 3 kg similarly as in the case of the first purified silicon.

Production of the second purified silicon was repeated 50 times by the procedures and conditions similar to those described above, to thereby produce the second purified silicon of 150 kg. The second purified silicon of 150 kg was melted again, and a sample for impurity concentration analysis was collected using a suction tube made of quartz, in the similar manner as described above. As a result of measurement of the impurity concentrations, iron and calcium were not detectable. That is, both the iron and calcium concentrations were less than 0.05 ppmw. The aluminum concentration was 0.09 ppmw. Each element satisfied the level of less than 0.1 ppmw required in the silicon material for use in solar cells.

According to the procedures of the first embodiment, metallurgical grade silicon was introduced 56 times, by 3 kg at each time, in addition to the metallurgical grade silicon of 24 kg melted before initiation of the processing. That is, metallurgical grade silicon of 192 kg in total was used to obtain the second purified silicon of 150 kg, resulting in the silicon yield rate of 78%.

Second Embodiment

The iron, aluminum and calcium concentrations in the molten silicon of 21 kg existent in crucible 21 after conducting the production processing of the first purified silicon 57 times in the first embodiment were 12000 ppmw, 3900 ppmw and 150 ppmw, respectively. Melting furnace 11 was tipped to discharge all the molten silicon of 21 kg within crucible 21 to a discharged-silicon receiver arranged in the vicinity of melting furnace 11.

Meanwhile, the iron, aluminum and calcium concentrations in the molten silicon of 21 kg existent in crucible 22 after conducting the production processing of the second purified silicon 50 times in the first embodiment were 140 ppmw, 170 ppmw and 9 ppmw, respectively. Melting furnace 12 was then raised to transfer all the molten silicon of 21 kg within crucible 22 to crucible 21 set in melting furnace 11.

Metallurgical grade silicon of 3 kg was introduced and melted in crucible 21. Then, the second purified silicon of 150 kg was produced in a manner similar to that in the first embodiment. The impurity concentrations in the second purified silicon of 150 kg were measured in a manner similar to that in the first embodiment, and the iron, aluminum and calcium elements were not detectable. That is, the concentration was less than 0.05 ppmw for each element, satisfying the level of 0.1 ppmw or less required in the silicon material for use in solar cells.

According to the procedures in the second embodiment, metallurgical grade silicon was introduced 57 times, by 3 kg at each time, so that metallurgical grade silicon of 171 kg in total was used to obtain the second purified silicon of 150 kg, resulting in the silicon yield rate of 88%. Together with the first embodiment, the metallurgical grade silicon of 363 kg was used to obtain the second purified silicon of 300 kg. That is, the silicon yield rate was improved from 78% to 83%.

Third Embodiment

The iron, aluminum and calcium concentrations in the molten silicon of 21 kg existent in crucible 21 after conducting the production processing of the first purified silicon 57 times in the second embodiment were 1000 ppmw, 1200 ppmw and 63 ppmw, respectively. In the molten silicon of 21 kg existent in crucible 22 after conducting the production processing of the second purified silicon 50 times in the second embodiment, on the other hand, the iron, aluminum and calcium concentrations were 13 ppmw, 59 ppmw and 4 ppmw, respectively. The molten silicon within crucible 21 was discharged, and then all the molten silicon within crucible 22 was transferred to crucible 21.

After introducing and melting metallurgical grade silicon of 3 kg in crucible 21, the second purified silicon of 150 kg was produced in a manner similar to that in the first embodiment. As a result of measurement of the impurity concentrations in the second purified silicon of 150 kg in a manner similar to that in the first embodiment, none of the iron, aluminum and calcium elements was detectable. That is, the concentration of each element was less than 0.05 ppmw, satisfying the level of less than 0.1 ppmw required in the silicon material for use in solar cells.

According to the procedures of the present embodiment, the yield rate of silicon was 88%, similar as in the case of the second embodiment. Together with the first and second embodiments, the metallurgical grade silicon of 534 kg was used to obtain the second purified silicon of 450 kg. This means that the silicon yield rate is improved from 78% to 84%.

Fourth Embodiment

In the fourth embodiment, silicon was purified with an apparatus in which a melting furnace 13 of the constitution similar to that of melting furnace 11 is arranged in parallel with melting furnaces 11 and 12. Metallurgical grade silicon of 24 kg was melted and held in melting furnace 11, similarly as in the first embodiment. At this time, however, metallic calcium of 20 kg was introduced and melted in addition to the metallurgical grade silicon.

A suction tube made of quartz with the molten silicon of about 20 g collected from crucible 21 was immediately immersed into water to rapidly solidify the same to be used as a sample for impurity concentration analysis. The calcium concentration was measured by ICP atomic emission spectrometry, which was 17 mass %. Since the metallic calcium vaporizes in a considerable amount upon melting, the calcium concentration was smaller than that (of 45 mass %) calculated from the introduced amount of the metallic calcium.

Subsequently, the procedures similar to those in the first embodiment were carried out, and the first purified silicon of 21 kg was held in crucible 22 set in melting furnace 12. At this time, a suction tube made of quartz with the molten silicon of about 20 g collected from crucible 22 was immediately immersed into water to rapidly solidify the same to be used as a sample for impurity concentration analysis. The phosphorus and calcium concentrations were measured by ICP atomic emission spectrometry, which were 1.5 ppmw and 1200 ppmw, respectively.

Metallic calcium of 16 kg was introduced and melted in crucible 22, and a sample for impurity concentration analysis was collected again. The calcium concentration measured by ICP atomic emission spectrometry was 15 mass %. Since the metallic calcium vaporizes in a considerable amount upon melting, the calcium concentration was smaller than that (of 42 mass %) calculated from the introduced amount of the metallic calcium.

Subsequently, the procedures similar to those in the first embodiment were carried out, and the second purified silicon was pulled up 7 times, by 3 kg at each time, from the molten silicon held in crucible 22 set in melting furnace 12. Then, the second purified silicon of 21 kg was melted and held in crucible 23 set in melting furnace 13. At this time, a suction tube made of quartz with the molten silicon of about 20 g collected from crucible 22 was immediately immersed in water to rapidly solidify the same to be used as a sample for impurity concentration analysis. The phosphorus and calcium concentrations were measured by ICP atomic emission spectrometry, which were 1.5 ppmw and 1200 ppmw, respectively.

During the above procedures, concurrently, the first purified silicon was pulled up seven times, by 3 kg at each time, from the molten silicon held in crucible 21 set in melting furnace 11, and then was melted and held in crucible 22 set in melting furnace 12, while metallurgical grade silicon was introduced seven times, by 3 kg at each time, and melted in the molten silicon held in crucible 21.

Metallic calcium of 14 kg was introduced and melted in crucible 23. A sample for impurity concentration analysis was collected again, and the calcium concentration was measured by ICP atomic emission spectrometry. The result was 13 mass %. Since the metallic calcium vaporizes in a considerable amount upon melting, the calcium concentration was smaller than that (of 40 mass %) calculated from the introduced amount of the metallic calcium.

Thereafter, concurrently, the first purified silicon was pulled up by 3 kg at one time from the molten silicon held in crucible 21 set in melting furnace 11, and melted and held in crucible 22 set in melting furnace 12, while metallurgical grade silicon was introduced by 3 kg at one time and melted in the molten silicon held in crucible 21.

Further, the second purified silicon was pulled up by 3 kg at one time from the molten silicon held in crucible 22 set in melting furnace 12, and melted and held in crucible 23 set in melting furnace 13.

Furthermore, the third purified silicon was pulled up by 3 kg at one time from the molten silicon held in crucible 23 set in melting furnace 13. By repeating the above-described operations 50 times, the third purified silicon of 150 kg was pulled up.

The impurity concentrations within the third purified silicon of 150 kg were measured in a manner similar to that in the first embodiment. As a result, phosphorus was not detectable. That is, the phosphorus concentration in the third purified silicon was less than 0.05 ppmw, satisfying the level of 0.1 ppmw or less required in the silicon material for use in solar cells.

Fifth Embodiment

In the present embodiment, melting furnaces 14 and 15 each having a constitution similar to that of melting furnace 11 are arranged in parallel with melting furnaces 11, 12 and 13.

In the fourth embodiment, the third purified silicon was pulled up seven times, by 3 kg at each time, from the molten silicon held in crucible 23 set in melting furnace 13, and the third purified silicon of 21 kg was melted and held in a crucible 24 set in melting furnace 14. At this time, a suction tube made of graphite with the molten silicon of about 20 g collected from crucible 24 was immediately immersed into water to rapidly solidify the same to be used as a sample for impurity concentration analysis. The calcium concentration measured by ICP atomic emission spectrometry was 900 ppmw.

In a similar manner as in the fourth embodiment, except for not introducing calcium, the fourth purified silicon was pulled up by 3 kg at one time from the molten silicon held in crucible 24 set in melting furnace 14, and melted and held in a crucible 25 set in melting furnace 15. Further, fifth purified silicon was pulled up by 3 kg at one time from the molten silicon held in crucible 25 set in melting furnace 15. By repeating the above-described operations 50 times, the fifth purified silicon of 150 kg was pulled up.

The calcium concentration within the fifth purified silicon of 150 kg was measured in a manner similar to that in the first embodiment. As a result, no calcium was detectable. In addition, as a result of measurement of the iron, aluminum and phosphorus concentrations, no element was detectable either. That is, the impurity concentration within the fifth purified silicon was less than 0.05 ppmw, satisfying the level of 0.1 ppmw or less required in the silicon material for use in solar cells.

Sixth Embodiment

The iron, aluminum, calcium and phosphorus concentrations in the molten silicon of 21 kg existent in each of crucibles 21, 22, 23, 24, and 25 after production of the fifth purified silicon of 150 kg in the fifth embodiment are shown in Table 1.

TABLE 1

Impurity Concentrations in Molten Silicon After Producing Fifth Purified Silicon of 150 kg

| | Iron | Aluminum | Calcium | Phosphorus |
|---|---|---|---|---|
| Crucible 21 | 11000 | 3500 | 18000 | 240 |
| Crucible 22 | 140 | 170 | 17000 | 25 |
| Crucible 23 | 0.12 | 0.59 | 15000 | 2.4 |
| Crucible 24 | <0.05 | <0.05 | 6400 | 0.17 |
| Crucible 25 | <0.05 | <0.05 | 160 | 0.11 | unit: ppmw

Melting furnace 11 was tipped to discharge all the molten silicon of 21 kg held in crucible 21 to a discharged-silicon receiver arranged in the vicinity of melting furnace 11. Thereafter, melting furnace 12 was raised to transfer the molten silicon of 21 kg existent in crucible 22 to crucible 21 set in melting furnace 11. Similarly, the molten silicon of 21 kg was transferred from crucible 23 to crucible 22, from crucible 24 to crucible 23, and from crucible 25 to crucible 24, respectively.

Metallic calcium of 140 g was introduced and melted in the molten silicon of 21 kg in crucible 23, similarly as in the case of the fourth embodiment, to set the calcium concentration within the molten silicon in crucible 23 to 13 mass %. Thereafter, the fifth purified silicon of 150 kg was produced, in a manner similar to that of the fifth embodiment. The iron, aluminum, calcium and phosphorus concentrations within the fifth purified silicon of 150 kg were measured by ICP atomic emission spectrometry. As a result, none of these elements was detectable. That is, the impurity concentration in the fifth purified silicon was less than 0.05 ppmw, satisfying the level of 0.1 ppmw or less required in the silicon material for use in solar cells.

According to the procedures of the present embodiment, the silicon yield rate becomes 88%, similarly as in the case of the second embodiment. By repeating the procedures of the present embodiment, the silicon yield rate can be improved from 78% to approach 88%, similarly as in the cases of the second and third embodiments.

The invention claimed is:

1. A method for purifying a metal, comprising:
a first step of holding a first molten metal containing impurities in a first crucible;
a second step of immersing a first cooling body in the first molten metal held in the first crucible while letting a cooling fluid flow in the interior of the cooling body to crystallize a first purified metal on a surface of the cooling body;
a third step of taking out the first cooling body with the first purified metal crystallized thereon from the first molten metal;
a fourth step of holding in a second crucible a second molten metal having an impurity concentration less than that of the first molten metal of the first step;
a fifth step of melting the first purified metal crystallized in the second step to form a molten first purified metal and holding the molten first purified metal in said second crucible together with the second molten metal held in the fourth step;
a sixth step of immersing a second cooling body in the second molten metal held in the fifth step while letting a cooling fluid flow in the interior of the cooling body to crystallize a second purified metal on a surface of the cooling body; and
a seventh step of taking out the second cooling body with the second purified metal crystallized thereon in the sixth step from the second molten metal;
wherein the sixth and seventh steps are carried out a plurality of times, with repetition of the first through fifth steps a plurality of times, by adding and melting in the first crucible an impurity-containing metal of an amount equal to the amount of the first purified metal crystallized in the first through fifth steps:
wherein said impurities comprise iron, aluminum, calcium and phosphorus, and
wherein said iron, aluminum, calcium and phosphorus is reduced to a level of 0.1 ppmw or less.

2. The method for purifying a metal according to claim 1, further comprising:
an m-th step of holding in a crucible an n-th molten metal having an impurity concentration less than that of a molten metal of an (m−4)-th step after an (m−1)-th step, where m =4(n−1) and n is a natural number of 3 or larger;
an (m+1)-th step of melting an (n−1)-th purified metal crystallized in an (m−2)-th step and holding the molten metal in an n-th crucible together with the n-th molten metal held in the m-th step;
an (m+2)-th step of immersing an n-th cooling body in the molten metal held in the (m+1)-th step while letting a cooling fluid flow in the interior of the cooling body to crystallize an n-th purified metal on a surface of the cooling body; and
an (m+3)-th step of taking out the n-th cooling body with the n-th purified metal crystallized thereon in the (m+2)-th step from the n-th molten metal;
wherein the m-th through (m+3)-th steps are further carried out a plurality of times.

3. The method for purifying a metal according to claim 2, wherein after the (m+3)-th step, the n-th cooling body with the n-th purified metal crystallized on its surface having been melted out is used again as the n-th cooling body in the (m+2)-th step.

4. The method for purifying a metal according to claim 2, wherein the n-th molten metal is used as the (n−1)-th molten metal in a predetermined number of times.

5. The method for purifying a metal according to claim 2, wherein the molten metal is silicon, the impurity is phosphorus, n is 5 or 6, and calcium is added in the first through third molten metals.

6. The method for purifying a metal according to claim 1, wherein after the fifth step, the first cooling body with the first purified metal crystallized on its surface having been melted out is used again as the first cooling body in the second step.

7. The method for purifying a metal according to claim 1, wherein after the seventh step, the second cooling body with the second purified metal crystallized on its surface having been melted out is used again as the second cooling body in the sixth step.

8. The method for purifying a metal according to claim 1, wherein the second molten metal is used as the first molten metal in a predetermined number of times.

9. The method for purifying a metal according to claim 1, wherein a material for reducing a segregation coefficient of the impurity is added in the molten metal.

* * * * *